US011153840B2

(12) United States Patent
Yu et al.

(10) Patent No.: US 11,153,840 B2
(45) Date of Patent: Oct. 19, 2021

(54) UE FEEDBACK OF TIMING ADJUSTMENT AFTER A MEASUREMENT GAP

(71) Applicant: MediaTek Inc., Hsinchu (TW)

(72) Inventors: Tsang-Wei Yu, Hsinchu (TW); Din-Hwa Huang, Hsinchu (TW)

(73) Assignee: MediaTek Inc., Hsinchu (TW)

(*) Notice: Subject to any disclaimer, the term of this patent is extended or adjusted under 35 U.S.C. 154(b) by 0 days.

(21) Appl. No.: 16/831,939

(22) Filed: Mar. 27, 2020

(65) Prior Publication Data

US 2020/0314788 A1    Oct. 1, 2020

Related U.S. Application Data

(60) Provisional application No. 62/825,111, filed on Mar. 28, 2019, provisional application No. 62/826,109, filed on Mar. 29, 2019.

(51) Int. Cl.
*H04W 56/00* (2009.01)

(52) U.S. Cl.
CPC .................. *H04W 56/0065* (2013.01)

(58) Field of Classification Search
CPC .................................................. H04W 56/0065
See application file for complete search history.

(56) References Cited

U.S. PATENT DOCUMENTS

| 2004/0151143 | A1* | 8/2004 | Abdesselem | ..... | H04W 56/0045 370/336 |
| 2012/0014371 | A1* | 1/2012 | Weng | ..... | H04J 3/0682 370/350 |
| 2012/0178482 | A1* | 7/2012 | Seo | ..... | H04L 1/1854 455/501 |
| 2012/0184290 | A1 | 7/2012 | Kazmi et al. | | |
| 2015/0249934 | A1 | 9/2015 | Siomina et al. | | |
| 2015/0289267 | A1 | 10/2015 | Axmon et al. | | |
| 2016/0088534 | A1* | 3/2016 | Axmon | ..... | H04W 24/10 370/252 |
| 2016/0242058 | A1* | 8/2016 | Kazmi | ..... | H04W 24/10 |
| 2017/0006566 | A1* | 1/2017 | Zhang | ..... | H04W 56/0055 |
| 2017/0353895 | A1 | 12/2017 | Wu | | |
| 2018/0115357 | A1* | 4/2018 | Park | ..... | H04L 25/0224 |
| 2018/0279334 | A1* | 9/2018 | Lim | ..... | H04L 27/2607 |

(Continued)

FOREIGN PATENT DOCUMENTS

WO    WO-2015150374 A1 * 10/2015 ............ H04W 72/12

OTHER PUBLICATIONS

The International Search Report and the Written Opinion for PCT/CN2020/082070, dated Jul. 2, 2020.

(Continued)

*Primary Examiner* — Jamaal Henson
(74) *Attorney, Agent, or Firm* — Tong J. Lee (57) ABSTRACT

A user equipment terminal (UE) operates in a wireless network. The UE receives, from a base station, timing advance parameter values which indicate a time difference measured by the base station between uplink and downlink for a band occupied by one or more serving cells. The UE calculates a length of a post-measurement gap (post-MG) time period for the one or more serving cells based on the timing advance parameter values. The post-MG time period is after a measurement gap before uplink transmission. The UE then sends an indication of the length of the post-MG time period to the base station.

20 Claims, 7 Drawing Sheets

(56) References Cited

U.S. PATENT DOCUMENTS

2018/0324620 A1  11/2018  Harada et al.
2019/0090283 A1   3/2019  Yi et al.

OTHER PUBLICATIONS

ZTE 3GPP TSG-RAN WG4 Meeting #88 R4-1810742 Discussion on UL transmission after measurement gap, Aug. 24, 2018, pp. 1-4.
3GPP TS 38.133 Version 15.3.0 Release 15 (Oct. 2018), Section 4.1.2. Measurement Gap.
3GPP TS 38.213 Version 15.2.0 Release 15 (Jul. 2018), Section 4.2. Transmission Timing Adjustments.

* cited by examiner

UE FEEDBACK OF TIMING ADJUSTMENT AFTER A MEASUREMENT GAP

CROSS-REFERENCE TO RELATED APPLICATIONS

This application claims the benefit of U.S. Provisional Application No. 62/825,111 filed on Mar. 28, 2019 and U.S. Provisional Application No. 62/826,109 filed on Mar. 29, 2019, the entirety of which is incorporated by reference herein.

TECHNICAL FIELD

Embodiments of the invention relate to wireless communications; more specifically, to timing adjustment values generated by a User Equipment (UE).

BACKGROUND

The Fifth Generation New Radio (5G NR) is a telecommunication standard for mobile broadband communications. 5G NR is promulgated by the 3rd Generation Partnership Project (3GPP) to significantly improve on performance metrics such as latency, reliability and throughput. 5G NR includes major technological advancement over Long Term Evolution (LTE) and can interoperate with existing LTE networks.

A User Equipment (UE) in a 5G NR network performs measurements on received signals according to a configuration. For example, the UE may measurement the quality of received signals, such as Reference Signal Received Power (RSRP), Reference Signal Received Quality (RSRQ), and Signal to interference and noise ratio (SINR). The UE reports the measurement results back to a base station for resource management. Based on the measurement results, a base station configures parameters such as transmit power, user allocation, beamforming, data rates, handover criteria, modulation scheme, error coding scheme, etc.

A UE does not perform measurements in a frequency channel while receiving or transmitting signals in that same frequency channel. Thus, the network provides the UE with measurement gaps, which are time periods in which neither uplink nor downlink transmissions are scheduled. A UE may use the measurement gap to perform intra-frequency, inter-frequency and/or inter-RAT (radio access technology) measurements. The network configures the UE with the timing of the uplink/downlink transmissions and the measurement gaps.

SUMMARY

In one embodiment, a method is performed by a UE in a wireless network. The method comprises: receiving, from a base station, timing advance parameter values which indicate a time difference measured by the base station between uplink and downlink for a band occupied by one or more serving cell; calculating a length of a post-measurement gap (post-MG) time period for the one or more serving cells based on the timing advance parameter values. The post-MG time period is after a measurement gap before uplink transmission. The method further comprises sending an indication of the length of the post-MG time period to the base station.

In another embodiment, an apparatus is provided for wireless communication. The apparatus may be a UE. The apparatus comprises a memory and processing circuitry coupled to the memory. The apparatus is configured to perform the aforementioned method.

In yet another embodiment, a non-transitory computer-readable storage medium comprises instructions. The instructions, when executed by a machine, cause the machine to perform the aforementioned method for wireless communication.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for a UE to feedback timing information to a base station regarding a post-measurement gap (post-MG) time period. The feedback improves the base station's scheduling of uplink transmissions. A measurement gap is a time duration in which a UE performs measurements; neither uplink nor downlink transmissions are performed. A UE calculates the post-MG time period length by taking into account the timing advance values provided by a base station. During the post-MG time period, the UE may be unable to perform uplink transmission. Thus, by sending the post-MG time period length to the network, the UE informs the network that uplink transmission scheduled in the post-MG time period may be unfulfilled. If the network schedules uplink transmission in the post-MG time period, the UE may ignore and skip the scheduled uplink transmission.

When the transmission direction changes from downlink to uplink, the timing of a UE's uplink transmission may need to be adjusted to account for the timing difference between downlink and uplink. A base station may measure the UE's uplink transmission and request the UE to advance its uplink timing. In one embodiment, a base station may indicate the requested timing advance by a number of timing advance (TA) parameter values, such as $N_{TA}$, $N_{TA\_offset}$, $T_A$, etc. In the uplink transmission immediately after a measurement gap, a UE may be unable to fulfill the requested timing advance. For example, the UE may need time to retune its transceiver circuitry. The aforementioned post-MG time period length incorporates the network-requested timing advance and the UE's accumulated timing accuracy ($\Delta T_{AT}$) (which is a UE-controlled value not known to the network). The post-MG time period length indicates how long it may take a UE to be ready for uplink transmission after a measurement gap.

The disclosed method, as well as the apparatus and the computer product implementing the method, can be applied to wireless communication between a base station (e.g., a gNB in a 5G NR network) and UEs.

Figure 1:
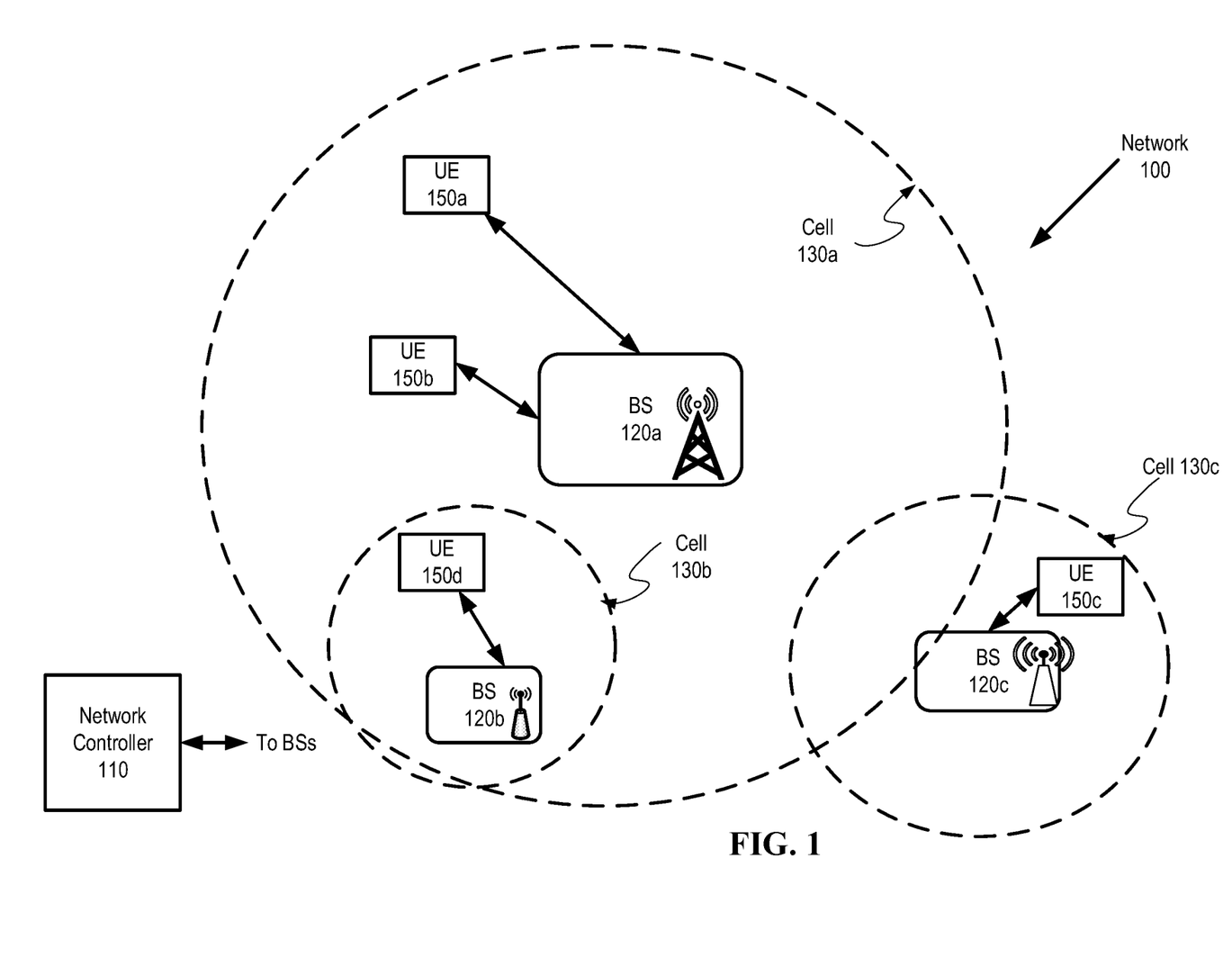
FIG. 1 is a diagram illustrating a network in which the embodiments of the present invention may be practiced.

FIG. 1 is a diagram illustrating a network 100 in which embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (shown as BSs), such as base stations 120a, 120b, and 120c, collectively referred to as the base stations 120. In some network environments such as a 5G NR network, a base station may be known as a gNodeB, a gNB, and/or the like. In an alternative network environment, a base station may be known by other names. Each base station 120 provides communication coverage for a particular geographic area known as a cell, such as a cell 130a, 130b or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective base stations 120 in their respective cells 130. A UE may have more than one serving cell; e.g., UE 150d may have both cell 130b and cell 130a as its serving cells. The transmission from a UE to a base station is called uplink transmission, and from a base station to a UE is called downlink transmission.

In one embodiment, each of the UEs 150 provides layer 3 functionalities through a radio resource control (RRC) layer, which is associated with the transfer of system information, connection control, and measurement configurations. Each of the UEs 150 further provides layer 2 functionalities through a packet data convergence protocol (PDCP) layer, a radio link control (RLC) layer and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through hybrid ARQ (HARM), priority handling, and logical channel prioritization. Each of the UEs 150 further provides layer 1 functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

It is noted that while the disclosed embodiments may be described herein using terminology commonly associated with 5G or NR wireless technologies, the present disclosure can be applied to other multi-access technologies and the telecommunication standards that employ these technologies.

Multiple time and frequency configurations are supported by NR. With respect to time resources, a frame may be 10 milliseconds (ins) in length, and may be divided into ten subframes of 1 MS each. Each subframe may be further divided into multiple equal-length time slots (also referred to as slots), and the number of slots per subframe may be different in different configurations. Each slot may be further divided into multiple equal-length symbol durations (also referred to as symbols). With respect to frequency resources, NR supports multiple different subcarrier bandwidths. Contiguous subcarriers (also referred to as resource elements (REs)) are grouped into one resource block (RB). In one configuration, one RB contains 12 subcarriers. Time resources of any time length combined with frequency resources of any bandwidth are herein referred to as time-and-frequency resources.

Figure 2:
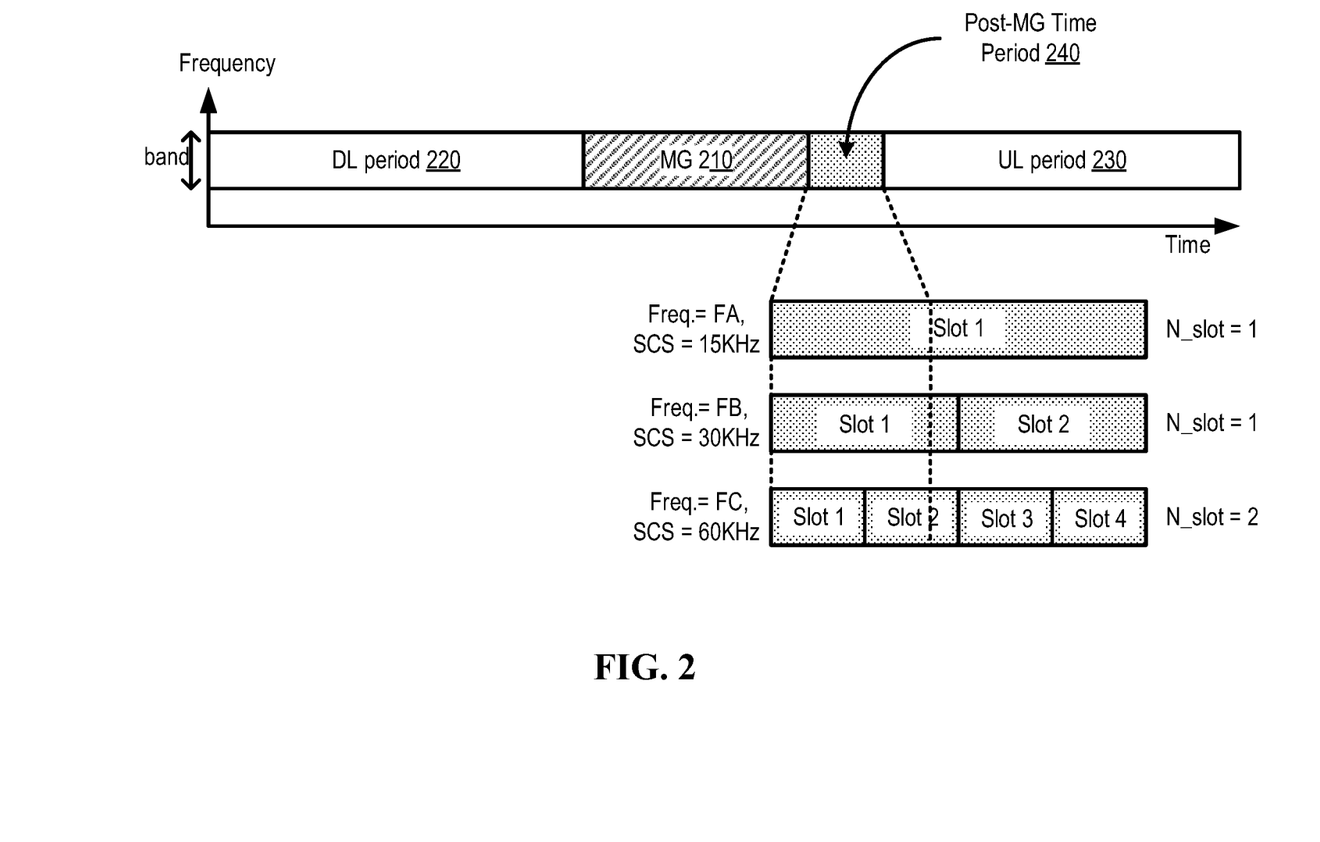
FIG. 2 is a schematic diagram illustrating an example of a post-measurement gap (post-MG) time period according to one embodiment.

FIG. 2 is a schematic diagram illustrating an example of a measurement gap 210 according to one embodiment. The measurement gap 210 contains time-and-resources for a UE to perform measurements of one or more serving cells. During the measurement gap 210, the UE performs measurements only; no uplink transmission and no downlink reception are performed by the UE. In the time domain, the measurement gap 210 follows a downlink period 220 and precedes an uplink period 230. The downlink period 220 may include one or more downlink subframes or slots, during which downlink signals may be transmitted from a base station to the UE. The uplink period 230 may include one or more uplink subframes or slots, during which uplink signals may be transmitted from the UE to a base station. After the measurement gap 210 and before the uplink period 230 is a post-MG time period 240. The measurement gap 210, the uplink period 220, the downlink period 230, and the post-MG time period 240 occupy the same band. During the post-MG time period 240, the UE may skip uplink transmission if the network schedules any uplink transmission in the time period 240 for the band.

In one embodiment, the UE calculates the length of the post-MG time period 240 and sends the time period 240 to the base station of a serving cell. The UE may send an indication of the time period 240 in response to a command from the base station, or periodically according to a time period configuration.

In one embodiment, the calculation of the UE applies to a timing advance group (TAG) which may include one or more serving cells. A UE may belong to more than one TAG. The UE calculates a post-MG time period for each TAG, and send the calculated post-MG time period to a base station of each TAG.

In one embodiment, a UE may calculate the post-MG time period 240 and send the post-MG time period 240 as a time value (e.g., X milliseconds) to a base station. In another embodiment, a UE may calculate the post-MG time period 240 and send the post-MG time period 240 as a number of slots to a base station. The number of slots impacted by the post-MG time period 240 depends on the subcarrier spacing (SCS). A band in the frequency domain may include one or more frequency layers, and each frequency layer may use SCS different from another frequency layer. In the example of FIG. 2, the length of the post-MG time period 240 may be equal to a portion of one slot for SCS=15 kHz (in frequency layer FA), a portion of one slot for SCS=30 kHz (in frequency layer FB), and more than one slot (e.g., 1.8 slots) for SCS=60 kHz (in frequency layer FC). The UE may report the post-MG time period 240 to a base station as N_slot, which is the number of slots impacted by the time period 240. More specifically, N_slot is the length of the post-MG time period 240 converted to the number of slots for the SCS and rounded up to the nearest integer. For example, N_slot=1 for SCS=15 kHz and 30 kHz, and N_slot=2 for SCS=60 kHz. The conversion to the number of slots introduces a rounding error in N_slot. That is, N_slot includes the network-requested timing advance, the UE's accumulated timing accuracy (ATAT) and a rounding error.

Figure 3:
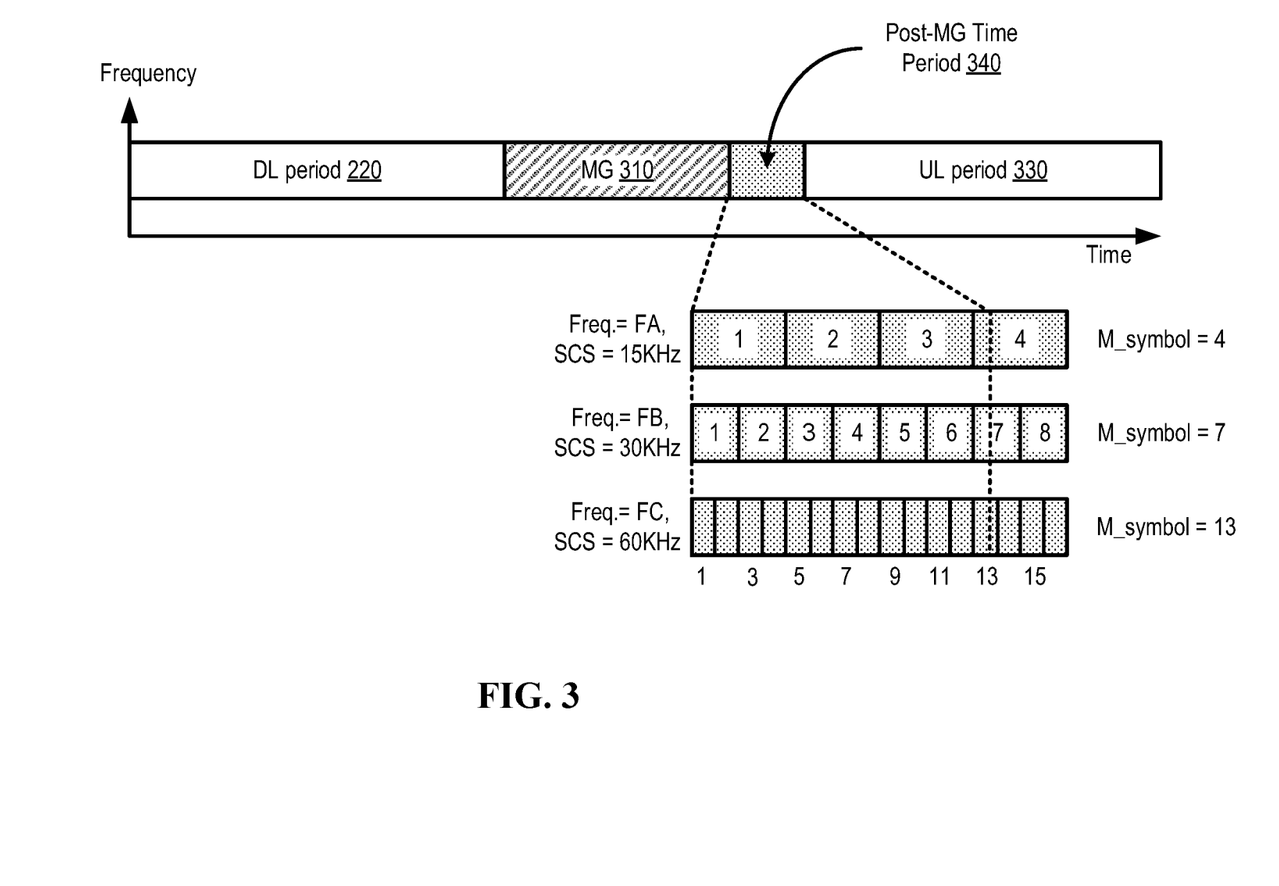
FIG. 3 is a schematic diagram illustrating another example of a post-MG time period according to one embodiment.

FIG. 3 is a schematic diagram illustrating an example of a measurement gap 310 according to one embodiment. Similar to the measurement gap 210 in FIG. 2, the measurement gap 310 follows a downlink period 320 and precedes an uplink period 330. After the measurement gap 310 and before the uplink period 330 is a post-MG time period 340. Similar to the example in FIG. 2, a UE may calculate the post-MG time period 340 and send the post-MG time period 340 as a time value (e.g., X milliseconds) to a base station. Alternatively, a UE may calculate the post-MG time period 340 and sent the post-MG time period 340 as a number of symbols to a base station. The number of symbols impacted by the post-MG time period 340 depends on the subcarrier spacing (SCS). In the example of FIG. 3, the post-MG time period 340 may occupy 3.2 symbols for SCS=15 kHz (in frequency layer FA), may occupy 6.4 symbols for SCS=30 kHz (in frequency layer FB), and may occupy 12.8 symbols for SCS=60 kHz (in frequency layer FC). The UE may report the post-MG time period 340 to a base station as M_symbol, which is the number of symbols impacted by the time period 340. More specifically, M_symbol is the length of the post-MG time period 340 converted to the number of symbols for the SCS and rounded up to the nearest integer. For example, M_symbol=4 for SCS=15 kHz, M_symbol=7 for SCS=30 kHz, and M_symbol=13 for SCS=60 kHz. The conversion to the number of symbols introduces a rounding error in M_symbol. That is, M_symbol includes the network-requested timing advance, the UE's accumulated timing accuracy ($\Delta T_{AT}$) and a rounding error.

Based on the post-MG time period (in the form of a number of slots, a number of symbols, or a time value), the network (e.g., a base station) and/or the UE may determine whether the UE can perform uplink transmission in the post-MG time period. If the network schedules uplink transmission in the post-MG time period, the UE may have the option to skip uplink transmission in the post-MG time period.

Figure 4A:
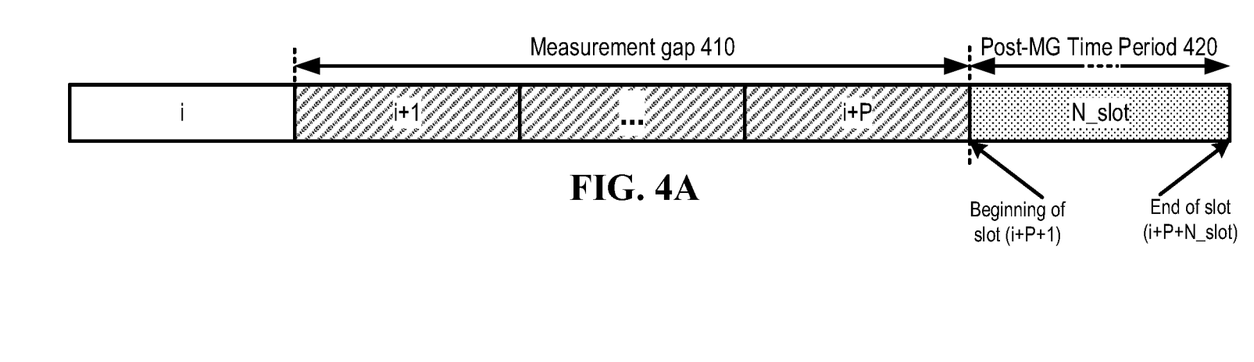
FIG. 4A shows an example in which measurement gap timing advance (MGTA) is not applied and a post-MG time period is indicated as a number of slots according to one embodiment.
Figure 4B:
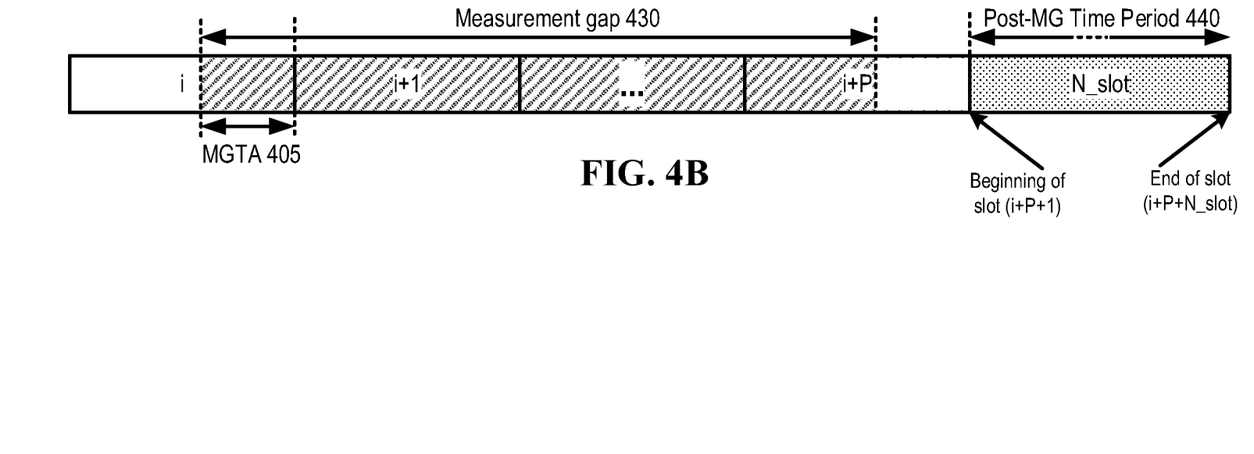
FIG. 4B shows an example in which MGTA is applied and a post-MG time period is indicated as a number of slots according to one embodiment.
Figure 4C:
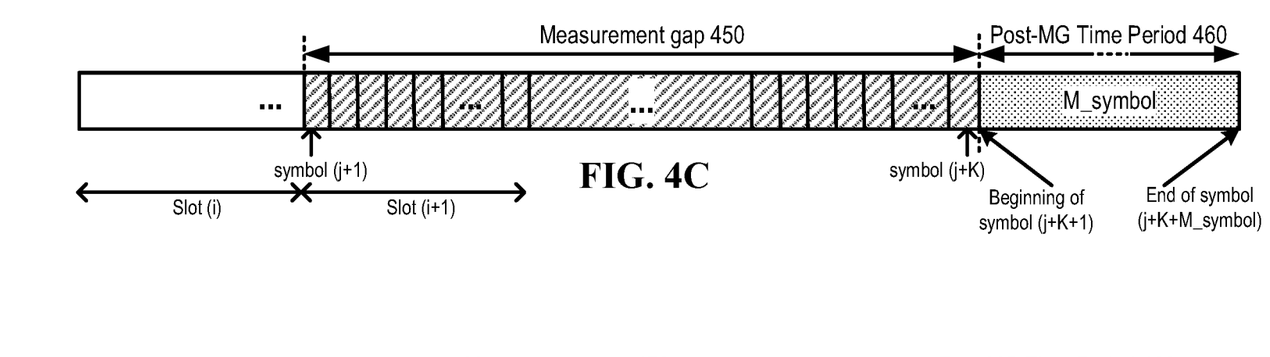
FIG. 4C shows an example in which MGTA is not applied and a post-MG time period is indicated as a number of symbols according to one embodiment.
Figure 4D:
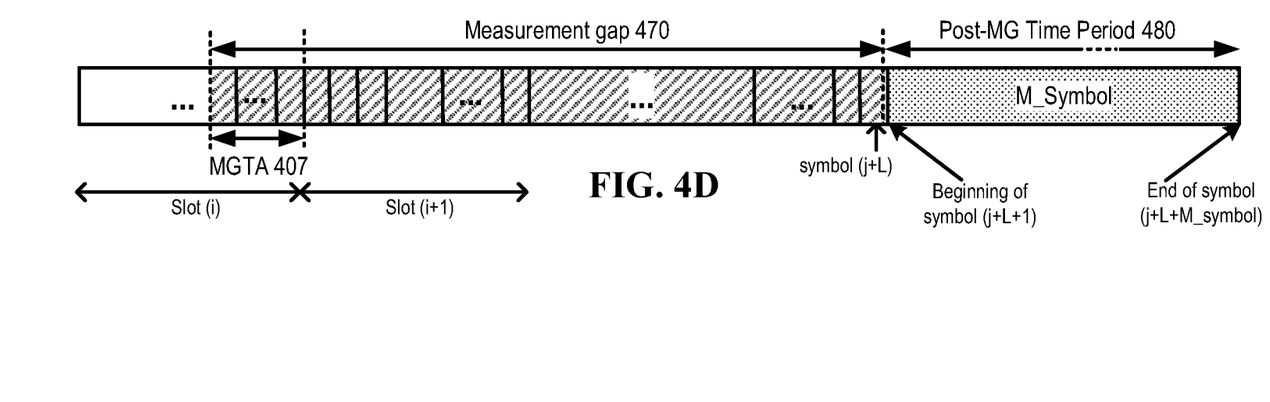
FIG. 4D shows an example in which MGTA is applied and a post-MG time period is indicated as a number of symbols according to one embodiment.

FIGS. 4A-4D illustrate examples of measurement gaps according to some embodiments. FIG. 4A shows an example in which measurement gap timing advance (MGTA) is not applied and the post-MG time period is indicated as a number of slots. FIG. 4B shows an example in which MGTA is applied and the post-MG time period is indicated as a number of slots. FIG. 4C shows an example in which measurement gap timing advance (MGTA) is not applied and the post-MG time period is indicated as a number of symbols. FIG. 4D shows an example in which MGTA is applied and the post-MG time period is indicated as a number of symbols.

In FIG. 4A, after a measurement gap 410 of P slots (from the beginning of slot (i+1) to the end of slot (i+P)) is a post-MG time period 420. The post-MG time period 420 begins at the beginning of slot (i+P+1), which is immediately after the measurement gap 410 and is fully non-overlapped with the measurement gap 410. In one embodiment, when MGTA is not applied, the UE-calculated N_slot (in FIG. 2) with respect to the SCS of an uplink carrier starts from the slot that occurs immediately after the measurement gap 410 and fully non-overlapped with the measurement gap 410. In the example of FIG. 4A, the UE-calculated N_slot starts from the beginning of slot (i+P+1) and ends at the end of slot (i+P+N_slot). It is noted that the post-MG time period 420 of length N_slot is not drawn to scale with respect to the shots in the measurement gap 410. The length N_slot may be equal to one, two, or another integer greater than two.

In FIG. 4B, a measurement gap 430 is advanced in time by a time length of MGTA 405. Thus, the measurement gap 430 starts during slot (i) and ends during slot (i+P). A post-MG time period 440, in this case, begins at the beginning of slot (i+P+1). The post-MG time period 440 starts immediately after the ending slot (i+P), where the ending slot is partially overlapped with the measurement gap 430. In one embodiment, when MGTA is applied, the UE-calculated N_slot (in FIG. 2) with respect to the SCS of an uplink carrier starts from the slot (e.g., slot (i+P+1)) that occurs immediately after the slot (e.g., slot (i+P)) which is partially overlapped with the measurement gap 430. In the example of FIG. 4B, the UE-calculated N_slot starts from the beginning of slot (i+P+1) and ends at the end of slot (i+P+N_slot). It is noted that the post-MG time period 440 of length N_slot is not drawn to scale with respect to the shots in the measurement gap 430. The length N_slot may be equal to one, two, or another integer greater than two.

In FIG. 4C, after a measurement gap 450 of K symbols (from the beginning of symbol (j+1) to the end of symbol (j+K)) is a post-MG time period 460. The post-MG time period 460 begins at the beginning of symbol (j+K+1), which is immediately after the measurement gap 450 and is fully non-overlapped with the measurement gap 450. In one embodiment, when MGTA is not applied, the UE-calculated M_symbol (in FIG. 3) with respect to the SCS of an uplink carrier starts from the symbol that occurs immediately after the measurement gap 450 and fully non-overlapped with the measurement gap 410. In the example of FIG. 4C, the UE-calculated M_symbol starts from the beginning of symbol (j+K+1) and ends at the end of symbol (j+K+M_symbol). It is noted that the post-MG time period 460 of length M_symbol is not drawn to scale with respect to the symbols in the measurement gap 410. The length M_symbol is equal to a positive integer.

In FIG. 4D, a measurement gap 470 is advanced in time by a time length of MGTA 407. Thus, the measurement gap 470 starts at a symbol in slot (i) and ends at symbol (j+L). A post-MG time period 480, in this case, begins at the beginning of symbol (j+L+1). The post-MG time period 480 starts immediately after the ending symbol (j+L), where the ending symbol is partially overlapped with the measurement gap 470. In one embodiment, when MGTA is applied, the UE-calculated M_symbol (in FIG. 3) with respect to the SCS of an uplink carrier starts from the symbol (e.g., symbol (j+L+1)) that occurs immediately after the symbol (e.g., symbol (j+L)) which is partially overlapped with the measurement gap 470. In the example of FIG. 4B, the UE-calculated M_symbol starts from the beginning of symbol (j+L+1) and ends at the end of symbol (j+L+M_symbol). It is noted that the post-MG time period 480 of length M_symbol is not drawn to scale with respect to the shots in the measurement gap 470. The length M_symbol is equal to a positive integer.

Figure 5:
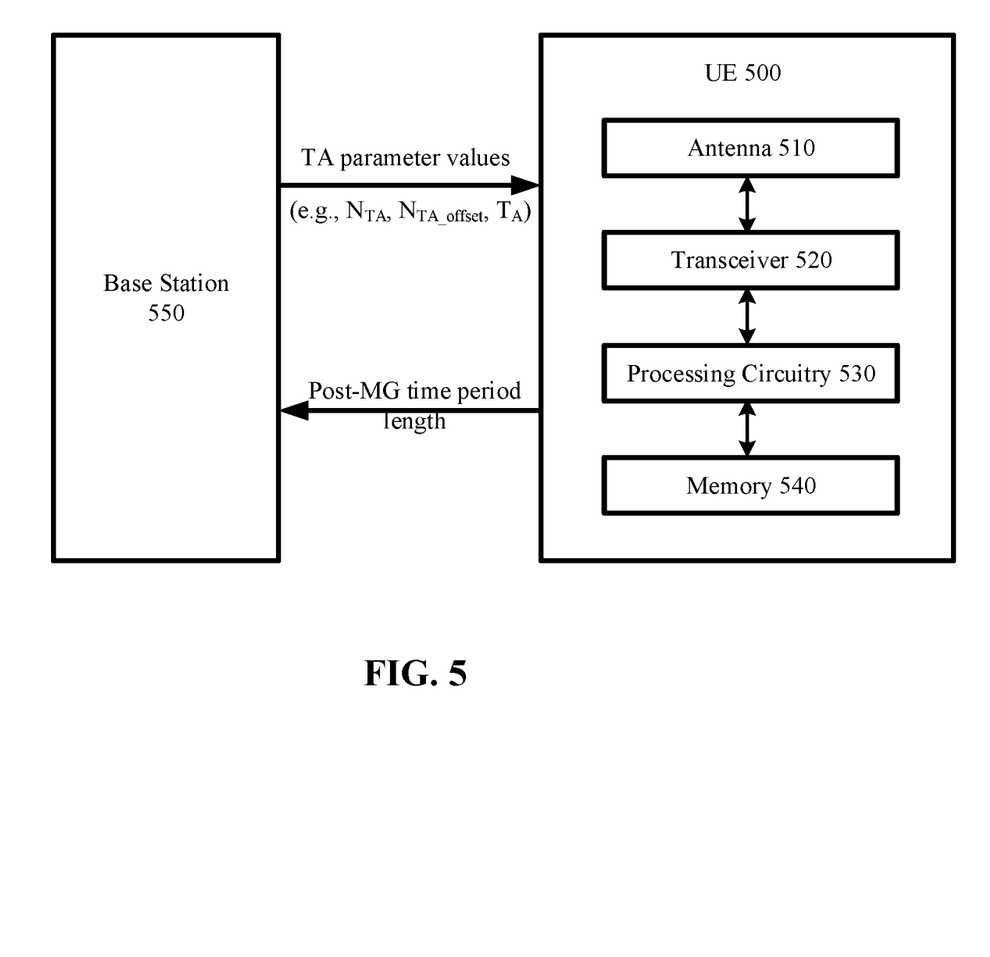
FIG. 5 is a block diagram illustrating elements of a UE performing wireless communication with a base station according to one embodiment.

FIG. 5 is a block diagram illustrating elements of a UE 500 performing wireless communication with a base station 550 according to one embodiment. In one embodiment, the base station 550 may be a gNb or the like operating in a wireless network, such as the wireless network 100 in FIG. 1. In one embodiment, the UE 500 may be any of the UEs 150 operating in the wireless network 100 in FIG. 1.

As shown, the UE 500 may include an antenna 510, and a transceiver circuit (also referred to as a transceiver 520) including a transmitter and a receiver configured to provide radio communications with another station in a radio access network, including communication in an unlicensed spectrum. The transmitter and the receiver may include filters in the digital front end for each cluster, and each filter can be enabled to pass signals and disabled to block signals. The UE 500 may also include processing circuitry 530 which may include one or more control processors, signal processors, central processing units, cores, and/or processor cores. The UE 500 may also include a memory circuit (also referred to as memory 540) coupled to the processing circuitry 530. The UE 500 may also include an interface (such as a user interface). The UE 500 may be incorporated into a wireless system, a station, a terminal, a device, an appliance, a machine, and IoT operable to perform wireless communication in an unlicensed spectrum, such as a 5G NR network. It is understood the embodiment of FIG. 5 is simplified for illustration purposes. Additional hardware components may be included.

In one embodiment, the processing circuitry 530 of the UE 500 may calculate the length of a post-MG time period (e.g., the post-MG time period 240, 340, 420 or 440 in FIGS. 2, 3, 4A or 4B). The UE 500 may perform the calculation based on the timing advance (TA) parameter values (such as $N_{TA}$, $N_{TA\_offset}$, $T_A$) from the network. In one embodiment, a base station may send a timing advance command to the UE, wherein the command indicates the TA parameter values. Some of the TA parameters may have different values for different TAGs.

After receiving the TA parameter values from the base station, the processing circuitry 530 of the UE 500 may calculate a time adjustment value=$(N_{TA}+N_{TA\_offset}) \times Tc$. The TA parameter $N_{TA}$ provides a time alignment value, $N_{TA\_offset}$ provides an offset to the time alignment value, and Tc is a time unit known to the UE. In one embodiment, the UE may calculate a new time adjustment value by updating an old time adjustment value; e.g., the UE may calculate an updated $N_{TA}$ (e.g., $N_{TA\_new}$) based on a previous $N_{TA}$ (e.g., $N_{TA\_old}$) and an index value $T_A$. For example, for a subcarrier spacing of $2^u \cdot 15$ kHz, $$N_{TA\_new} = N_{TA\_old} + (T_A - 31) \times 16 \times \frac{64}{2^u}.$$

The UE 500 may further adjust the time adjustment value $(N_{TA}+N_{TA\_offset}) \times Tc$ by the UE's accumulated timing accuracy $\Delta T_{AT}$. The value $\Delta T_{AT}$ indicates the difference between network-requested timing advance and the actual timing advance that can be achieved by the UE. The value $\Delta T_{AT}$ is specific to the UE and controlled by the UE. The value $\Delta T_{AT}$ is less than a tolerance required by a network standard. Thus, the actual timing advance value applied by the UE at each update is $$\left(N_{TA\_old} + (T_A - 31) \times 16 \times \frac{64}{2^u} + N_{TA\_offset}\right) \times Tc + \Delta T_{AT},$$

$$\text{or } \left(N_{TA\_old} + (T_A - 31) \times 16 \times \frac{64}{2^u}\right) \times Tc + \Delta T_{AT} + N_{TA\_offset} \times Tc.$$

At each update, the UE may adjust the value $\Delta T_{AT}$.

The aforementioned post-MG timing period length 240 (FIG. 2) or 340 (FIG. 3) includes the actual timing advance value and any applicable rounding errors when converting the time value of the time period length 240 into a number of slots or symbols. The actual timing advance value includes the network-requested timing advance value and the UE's accumulated timing accuracy $\Delta T_{AT}$. As mentioned previously, the UE 500 may be unable to fulfill any uplink transmissions scheduled in the post-MG timing period. The number of slots in the post-MG time period, depending on the subcarrier spacing and the frequency range (e.g., FR1 or FR2), may be one slot, two slots, or more than two slots. The base station relies on the UE's feedback to obtain the post-MG timing period length, as a time value, a number of slots or a number of symbols impacted by the post-MG timing period. The base station may adjust the scheduling of uplink transmission accordingly.

In one embodiment, the UE 500 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 540 may include a non-transitory computer-readable storage medium that stores computer-readable program code. The code, when executed by the processors, causes the processors to perform operations according to embodiments disclosed herein, such as a method to be described in FIG. 6.

Although the UE 500 is used in this disclosure as an example, it is understood that the methodology described herein is applicable to any computing and/or communication device capable of performing wireless communications.

Figure 6:
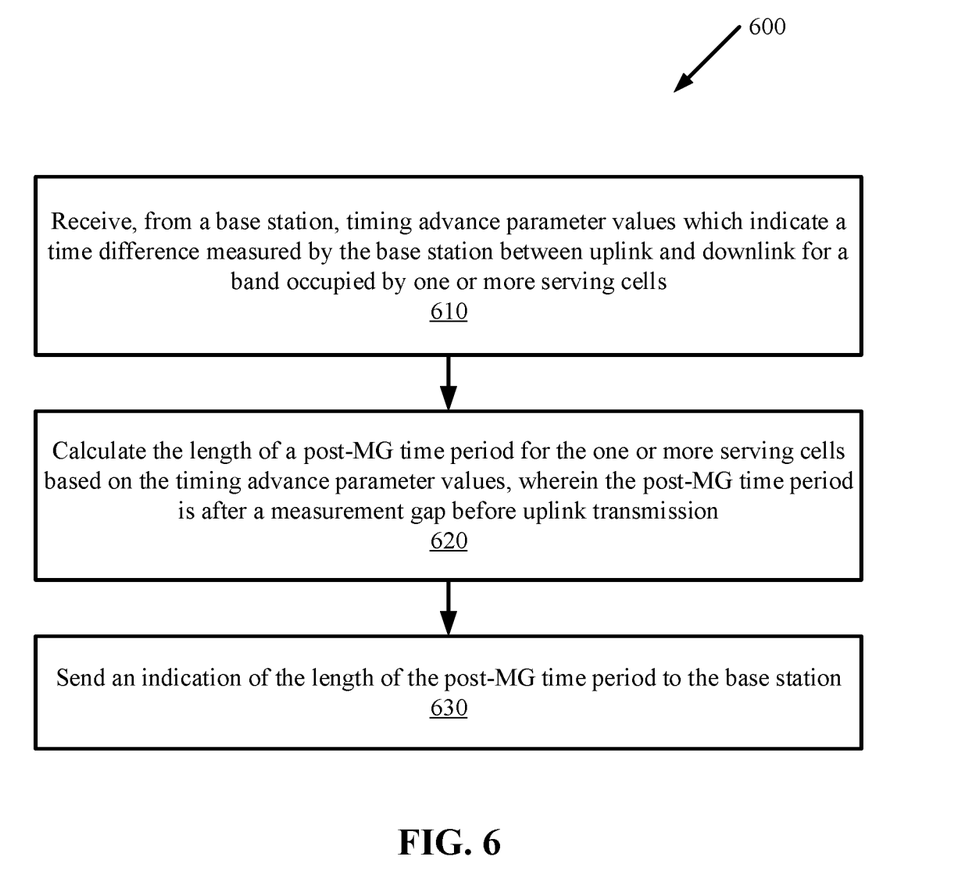
FIG. 6 is a flow diagram illustrating a method performed by a UE in a wireless network according to one embodiment.

FIG. 6 illustrates a method 600 performed by a UE in a wireless network according to one embodiment. In one embodiment, the wireless network is a 5G NR network. In one embodiment, an example of the wireless network may be the network 100 in FIG. 1.

The method 600 starts at step 610 when a UE receives timing advance parameter values from a base station. The timing advance parameter values indicate a time difference measured by the base station between uplink and downlink for a band occupied by one or more serving cells. The UE at step 620 calculates the length of a post-MG time period for the one or more serving cells based on the timing advance parameter values. The post-MG time period is after a measurement gap before uplink transmission. The UE at step 630 sends an indication of the length of the post-MG time period to the base station.

The operations of the flow diagram of FIG. 6 has been described with reference to the exemplary embodiments of FIGS. 1 and 5. However, it should be understood that the operations of the flow diagram of FIG. 6 can be performed by embodiments of the invention other than the embodiments of FIGS. 1 and 5, and the embodiments of FIGS. 1 and 5 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a UE in a wireless network, comprising:
   receiving, from a base station, timing advance parameter values which indicate a time difference measured by the base station between uplink and downlink for a band occupied by one or more serving cells;
   calculating a timing advance feedback for the one or more serving cells based on the timing advance parameter values, a UE-controlled accumulated timing accuracy, and a beginning time for the timing advance feedback, wherein the UE-controlled accumulated timing accuracy indicates a difference between a network-requested timing advance and an actual timing advance that can be achieved by the UE; and
   sending the timing advance feedback to the base station.

2. The method of claim 1, wherein the timing advance feedback is a post-measurement gap (post-MG) time period after a measurement gap before uplink transmission, and the beginning time for the timing advance feedback is an ending time of the measurement gap.

3. The method of claim 2, wherein, when no timing advance is applied to the measurement gap, the further comprises:
   skipping uplink transmission of N slots, starting from a first one of the N slots that occurs immediately after the measurement gap and is fully non-overlapped with the measurement gap, wherein each of the N slots is defined with respect to a subcarrier spacing of an uplink carrier in the frequency layer.

4. The method of claim 2, wherein, when a timing advance is applied to the measurement gap, the further comprises:
   skipping uplink transmission of N slots, starting from a first one of the N slots occurring immediately after a given slot that is partially overlapped with the measurement gap, wherein each of the N slots and the given slot is defined with respect to a subcarrier spacing of an uplink carrier in the frequency layer.

5. The method of claim 2, wherein, when no timing advance is applied to the measurement gap, the further comprises:
   skipping uplink transmission of M symbols, starting from a first one of the M symbols that occurs immediately after the measurement gap and is fully non-overlapped with the measurement gap, wherein each of the M symbols is defined with respect to a subcarrier spacing of an uplink carrier in the frequency layer.

6. The method of claim 2, wherein, when a timing advance is applied to the measurement gap, the further comprises:
   skipping uplink transmission of M symbols, starting from a first one of the M symbols occurring immediately after a given symbol that is partially overlapped with the measurement gap, wherein each of the M symbols and the given symbol is defined with respect to a subcarrier spacing of an uplink carrier in the frequency layer.

7. The method of claim 1, wherein sending the timing advance feedback further comprises:
   calculating a number of slots impacted by the timing advance feedback based on a subcarrier spacing of an uplink carrier in a frequency layer; and
   sending the number of slots as the timing advance feedback to the base station.

8. The method of claim 1, wherein sending timing advance feedback further comprises:
calculating a number of symbols impacted by the timing advance feedback based on a subcarrier spacing of an uplink carrier in a frequency layer; and
sending the number of symbols as the timing advance feedback to the base station.

9. The method of claim 1, wherein sending the timing advance feedback further comprises:
sending a time value indicating the length of the timing advance feedback to the base station.

10. The method of claim 1, wherein sending the timing advance feedback further comprises:
sending the timing advance feedback in response to a command from the base station.

11. The method of claim 1, wherein sending the timing advance feedback further comprises:
sending the timing advance feedback periodically according to a time period configuration.

12. The method of claim 1, wherein the timing advance parameter values include an $N_{TA}$ value and an $N_{TA\_offset}$ value used by the UE to compensate for the timing difference between the uplink and the downlink for a timing advance group (TAG) including the one or more serving cells.

13. The method of claim 12, further comprising:
updating the $N_{TA}$ value from $N_{TA\_old}$ to $N_{TA\_new}$ by calculating:

$$N_{TA\_new} = N_{TA\_old} + (T_A - 31) \times 16 \times \frac{64}{2\mu}$$

for a subcarrier spacing of $2^\mu \cdot 15$ kHz, wherein $T_A$ is an index value provided by the base station; and
calculating a length of the timing advance feedback by evaluating: $(N_{TA\_new} + N_{TA\_offset}) \times Tc + \Delta T_{AT}$, wherein Tc is a time unit value known to the UE and $\Delta T_{AT}$ is the UE-controlled accumulated timing accuracy.

14. The method of claim 1, further comprising:
calculating a respective timing advance feedback for each of a plurality of timing advance groups (TAGs) associated with the UE based on respective timing advance parameter values; and
sending the respective timing advance feedback for each TAG to the wireless network.

15. The method of claim 1, wherein the wireless network is a Fifth Generation New Radio (5G NR) network.

16. An apparatus for wireless communication, the apparatus being a user equipment terminal (UE), comprising:
a memory; and
processing circuitry coupled to the memory and operative to:
receive, from a base station, timing advance parameter values which indicate a time difference measured by the base station between uplink and downlink for a band occupied by one or more serving cells;
calculate a timing advance feedback for the one or more serving cells based on the timing advance parameter values, a UE-controlled accumulated timing accuracy, and a beginning time for the timing advance feedback, wherein the UE-controlled accumulated timing accuracy indicates a difference between a network-requested timing advance and an actual timing advance that can be achieved by the UE; and
send the timing advance feedback to the base station.

17. The apparatus of claim 16, wherein the processing circuitry is operative to:
calculate a number of slots impacted by the timing advance feedback based on a subcarrier spacing of an uplink carrier in a frequency layer; and
send the number of slots as the timing advance feedback to the base station.

18. The apparatus of claim 16, wherein the processing circuitry is operative to:
calculate a number of symbols impacted by the timing advance feedback based on a subcarrier spacing of an uplink carrier in a frequency layer; and
send the number of symbols as the timing advance feedback to the base station.

19. The apparatus of claim 16, wherein the timing advance feedback is a post-measurement gap (post-MG) time period after a measurement gap before uplink transmission, and the beginning time for the timing advance feedback is an ending time of the measurement gap.

20. A non-transitory computer-readable storage medium comprising instructions which, when executed by a machine, cause the machine to perform a method for wireless communication, the method comprising:
receiving, from a base station, timing advance parameter values which indicate a time difference measured by the base station between uplink and downlink for a band occupied by one or more serving cells;
calculating a timing advance feedback for the one or more serving cells based on the timing advance parameter values, a UE-controlled accumulated timing accuracy, and a beginning time for the timing advance feedback, wherein the UE-controlled accumulated timing accuracy indicates a difference between a network-requested timing advance and an actual timing advance that can be achieved by the UE; and
sending the timing advance feedback to the base station.

* * * * *